United States Patent Office 3,361,802
Patented Jan. 2, 1968

3,361,802
HALOGENATED AROMATIC ACIDS AND SALTS
Paul E. Hoch, Youngstown, N.Y., assignor to Hooker Chemical Corporation, Niagara Falls, N.Y., a corporation of New York
No Drawing. Filed Nov. 29, 1965, Ser. No. 510,370
2 Claims. (Cl. 260—515)

This is a continuation-in-part of copending application Ser. No. 284,785, filed May 29, 1963, which is a continuation-in-part of applications Ser. Nos. 25,519 and 25,557, filed April 29, 1960, now abandoned.

This invention relates to polychloroaromatic acids, of the following formula, mixtures thereof, and the alkali metal salts thereof:

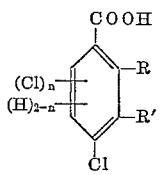

wherein $n$ is 1 or 2, and one of R and R' is selected from the group consisting of hydrogen and alkyl of 1 to 10 carbon atoms, and the other is selected from the group consisting of phenyl, substituted phenyl, and cycloalkyl wherein R and R' form a ring. Typical substituted phenyl radicals include chlorophenyl of 1 to 5 chlorine atoms, nitrophenyl of 1 or 2 nitro radicals, aminophenyl of 1 or 2 amino radicals, and the like. The cycloalkyl radicals preferably have 5 to 6 carbon atoms. The alkali metals of the corresponding salts are selected from sodium, potassium, rubidium, and cesium.

The compounds of the invention are useful as chain terminating agents in the preparation of polymers, such as polyester resins, epoxy resins, and the like. The compounds of the invention are also useful as non-migrating, flame retardant additives in polymers and other materials. The compounds of the invention are also useful in the preparation of plasticizers, surfactants, metal salt lubricants, and as chemical intermediates for various other chemical preparations.

The compounds of the invention are produced by reacting a halogenated bicyclic ketone of the following formula

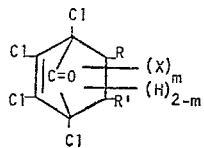

wherein $m$ is 0 or 1 and R and R' are as defined hereinbefore, and X is chlorine or bromine, with an alkali metal hydroxide. The resulting compound is an alkali metal salt of a dichloroaromatic acid if $m$ is 0, and an alkali metal salt of a trichloroaromatic acid if $m$ is 1. The alkali metal salts can be reacted with a mineral acid, such as hydrogen chloride to produce the corresponding aromatic acid.

In the production of the dichloroaromatic compounds, the reaction mixture generally contains the 2,4-dichloroaromatic compounds, in addition to the 3,4-dichloroaromatic compounds. The isomers can be separated from each other if desired. Direct production of the individual isomers is also contemplated.

In the reaction outlined hereinabove, one mole of ketone is reacted with at least three moles of an alkali metal hydroxide, and preferably from four to six moles. Any alkali metal hydroxide, i.e., sodium, potassium, rubidium, and cesium, can be employed, but sodium or potassium are preferred due to availability and lower cost. A solvent should be used, with at least a major portion of the solvent being alcoholic in order to establish a basic medium for the reaction. The lower molecular weight alcoholic solvents, such as methanol, ethanol, propanol or butanol, are preferred because the solubility of the alkali metal hydroxide is best in these; others that can be used include, for example, the higher molecular alcohols, benzene, toluene, xylene, and the like. The amount of solvent used is not critical, it being necessary only to maintain the solubility of the reactants. The reaction can be run in aqueous solution, if desired, but an alcoholic medium is preferred due to the aforesaid solubility factors. The reaction is highly exothermic and the reaction mixture will raise and reflux upon admixture of the reactants unless cooling is provided. The reaction is conveniently carried out at a temperature up to 145 degrees centigrade, generally in the range of 20 to 100 degrees centigrade, for a period from thirty minutes to three hours; however, neither the reaction time nor the reaction temperature is critical and, as will be apparent to one skilled in the art, wide variations in both can be tolerated.

The resultant alkali metal salt can then be recovered by conventional means and acidified to the free acid by conventional means, such as admixing with a mineral acid, for example, hydrochloric acid, sulfuric acid, phosphoric acid, and the like. The free acid can then be recovered by conventional means.

Typical compounds of the invention are listed below. These compounds are given for the purpose of illustration only and are not to be construed as limiting the present invention. In the following list, the 3,4-dichloroaromatic acids have been given for purposes of illustration. It will be understood that in every case the 2,4-dichloroaromatic acids are also contemplated:

3,4-dichloro-5-phenylbenzoic acid
3,4-dichloro-5-(4-chlorophenyl)-benzoic acid
3,4-dichloro-5-(2,4-dichlorophenyl)-benzoic acid
3,4-dichloro-5-(4-nitrophenyl)-benzoic acid
3,4-dichloro-5,6,7,8-tetrahydro-1-naphthoic acid
3,4-dichloro-5-phenyl-6-methylbenzoic acid
3,4-dichloro-5-(4-chlorophenyl)-6-ethylbenzoic acid
3,4-dichloro-5-(4-nitrophenyl)-6-methylbenzoic acid
2,3,4-trichloro-5-phenylbenzoic acid
2,3,4-trichloro-6-phenylbenzoic acid
2,3,4-trichloro-5-(4-chlorophenyl)-benzoic acid
2,3,4-trichloro-6-(4-nitrophenyl)-benzoic acid
2,3,4-trichloro-6-(2,4-dichlorophenyl)-benzoic acid
2,3,4-trichloro-5,6,7,8-tetrahydro-1-naphthoic acid, and the corresponding alkali metal salts, such as the sodium salt of 3,4-dichloro-5-phenyl benzoic acid.

The corresponding starting materials for the dichloroaromatic compounds are as follows:

1,4,5,6-tetrachloro-3-phenylbicyclo-(2.2.1)-5-heptene-7-one
1,4,5,6-tetrachloro-3-(4-chlorophenyl)bicyclo-(2.2.1)-5-heptene-7-one
1,4,5,6-tetrachloro-3-(4-nitrophenyl)bicyclo-(2.2.1)-5-heptene-7-one
1,2,3,4-tetrachlorotricyclo-(6.2.1.0$^{5,10}$)undecane-11-one and the like.

Typical starting materials for the trichloroaromatic compounds are as follows:

1,2,4,5,6-pentachloro-2-phenylbicyclo-(2.2.1)-5-heptene-7-one
1,2,4,5,6-pentachloro-3-phenylbicyclo-(2.2.1)-5-heptene-7-one
1,3,4,5,6-pentachloro-2-(4-chlorophenyl)bicyclo-(2.2.1)-5-heptene-7-one 1,3,4,5,6-pentachloro-3-(4-nitrophenyl)bicyclo-(2.2.1)-5-heptene-7-one
1,2,3,4,5-pentachlorotricyclo-(6.2.1.0$^{5,10}$)-undecane-11-one and the like.

The starting materials of the invention are known in the art, see McBee et al., Journal of the American Chemical Society, 77, 385 (1955). The reactants for use in producing the polychloroaromatic compounds can be prepared in accordance with the following general equations, wherein R, R', m and X are as defined above:

IIIb.

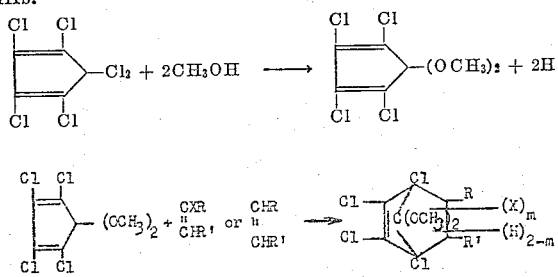

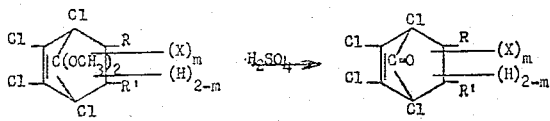

The preparation of the compounds of the invention is illustrated in the following specific examples which are intended to further exemplify the invention but not to limit it. All parts are by weight and temperatures are given in degrees centigrade, unless indicated otherwise.

EXAMPLE 1

*Preparation of 3,4 - dichloro- and 2,4 - dichloro-5,6,7,8-tetrahydro - 1 - napthoic acid, and the potassium salt thereof*

A solution of 1.5 grams of potassium hydroxide (85 percent) in twenty milliliters of absolute ethanol was warmed to reflux with stirring. To this solution was added during two minutes, 1.7 grams of recrystallized ketone, 1,2,3,4-tetrachlorotricyclo-(6.2.1.0$^{5,10}$) undecane-11-one, i.e., the ketone derived from the ketal cyclohexane adduct. The suspension was refluxed for an additional two hours cooled and filtered. The ethanol was removed from the filtrate under vacuum, and the pastry residue was treated with ten milliliters of water. A very small amount of water insoluble solid was removed by filtration, and the filtrate, a solution of potassium salt, was acidified with hydrochloric acid (1:1). The gummy solid resulting upon acidification was washed with water, air dried overnight and then taken up in refluxing cyclohexane. A crystalline solid weighing 0.25 gram (22 percent), melting point 132 to 145 degrees centigrade was recovered which was a mixture of the 3,4- and 2,4-isomers. Several recrystallizations from cyclohexane and the benzene raised the melting point to 145 to 158 degrees centigrade.

*Analysis.*—Calculated for $C_{11}H_{10}Cl_2O_2$: C, 53.91%; H, 4.08%; Cl, 28.95%; neut. equiv. 245. Found: C, 54.07%; H, 4.04%; Cl, 28.87%; neut. equiv. 246.

EXAMPLE 2

*Preparation of 2,3,4-trichloro-5,6,7,8-tetrahydro-1-naphthoic acid and the potassium salt thereof*

Using the procedure of Example 1, the compound 1,2,3,4,5 - pentachlorotricyclo - (6.2.1.0$^{5,10}$)-undecane-11-one is reacted in a solution of potassium hydroxide in absolute ethanol to produce the potassium salt of the corresponding 1-naphthoic acid, which is then acidified to produce 2,3,4 - trichloro - 5,6,7,8 - tetrahydro-1-naphthoic acid.

The following chart shows the preparation of other dichloroaromatic acids. These compounds are conveniently prepared in good yields in the manner of the foregoing examples. In every case, the product is a mixture of the 3,4- and 2,4-isomers.

| Ex. | Substituent R | Substituent R' | Compounds Used in Diels-Alder Adduction |
|---|---|---|---|
| 3 | Hydrogen | Phenyl | Styrene. |
| 4 | do | 4-chlorophenyl | 4-chlorostyrene. |
| 5 | do | 2,4-dichlorophenyl | 2,4-dichlorostyrene. |
| 6 | do | 4-nitrophenyl | 4-nitrostyrene. |
| 7 | Methyl | Phenyl | 1-phenylpropene-1. |
| 8 | (R and R' together form cyclopentyl) | | Cyclopentene. |

The following chart shows the preparation of other trichloroaromatic acids. These compounds may be conveniently prepared in good yields in the manner of the foregoing examples.

| Ex. | Substituent R | Substituent R' | Compounds Used in Diels-Alder Adduction |
|---|---|---|---|
| 9 | Phenyl | H | β-Chlorostyrene. |
| 10 | H | 2,4-dichlorophenyl | 2,4-dichloro-β-chlorostyrene. |
| 11 | (R and R' together form cyclopentyl) | | 1-chlorocyclopentene. |

This invention may be embodied in other forms or carried out in other ways without departing from the spirit or essential characteristic thereof. The present embodiment is therefore to be considered as in all respects illustrative and not restrictive.

What is claimed is:

1. A compound selected from the group consisting of compounds of the following formula, and the alkali metal salts thereof:

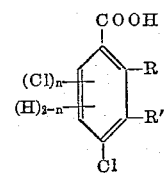

wherein n is 1 or 2, and one of R and R' is selected from the group consisting of hydrogen and alkyl of 1 to 10 carbon atoms and the other is selected from the group consisting of phenyl, chloro-substituted phenyl and nitro-substituted phenyl, and R and R' can be combined to form a cycloalkyl ring of 5 to 6 carbon atoms.

2. A compound according to claim 1 wherein R and R' form a cycloalkyl ring of 5 to 6 carbon atoms.

References Cited

FOREIGN PATENTS 279,436   4/1928   Great Britain.

LORRAINE A. WEINBERGER, *Primary Examiner.*

K. ROSE, V. GARNER, *Assistant Examiners.*